United States Patent [19]

Skaife

[11] 4,117,685
[45] Oct. 3, 1978

[54] METHOD AND MEANS FOR IRRIGATING SOIL AND GROWING PLANTS HAVING VARYING WATER REQUIREMENTS

[75] Inventor: William Skaife, Dubuque, Iowa
[73] Assignee: Margaret R. Skaife, Dubuque, Iowa
[21] Appl. No.: 812,793
[22] Filed: Jul. 5, 1977
[51] Int. Cl.² .................. A01G 27/00; E02B 13/00
[52] U.S. Cl. .................. 405/36; 47/48.5; 405/38
[58] Field of Search .......... 61/13, 12; 47/48.5, 47/79, 80, 62, DIG. 4; 239/145

[56] References Cited
U.S. PATENT DOCUMENTS

| | | | |
|---|---|---|---|
| 1,988,307 | 1/1935 | Fay | 47/48.5 X |
| 2,346,029 | 4/1944 | Jennings | 61/13 X |
| 2,536,196 | 1/1951 | MacLeod | 61/13 |
| 2,763,991 | 9/1956 | Kennon | 61/13 |
| 2,850,843 | 9/1958 | Marbury | 61/13 X |
| 2,909,002 | 10/1959 | Hendry | 61/13 X |
| 3,408,818 | 11/1968 | Hemphill | 61/13 |
| 3,757,469 | 9/1973 | Smith et al. | 61/13 X |

Primary Examiner—Dennis L. Taylor
Attorney, Agent, or Firm—Zarley, McKee, Thomte, Voorhees & Sease

[57] ABSTRACT

A material having high water absorption and retention capacity is placed in a water impermeable trench beneath a top coversoil and water is supplied to the material for being transmitted by capillary action to the top soil. The material may be vitera. The roots of plants having varying water requirements will grow to whatever depth is appropriate for their needs.

8 Claims, 7 Drawing Figures

U.S. Patent  Oct. 3, 1978  4,117,685
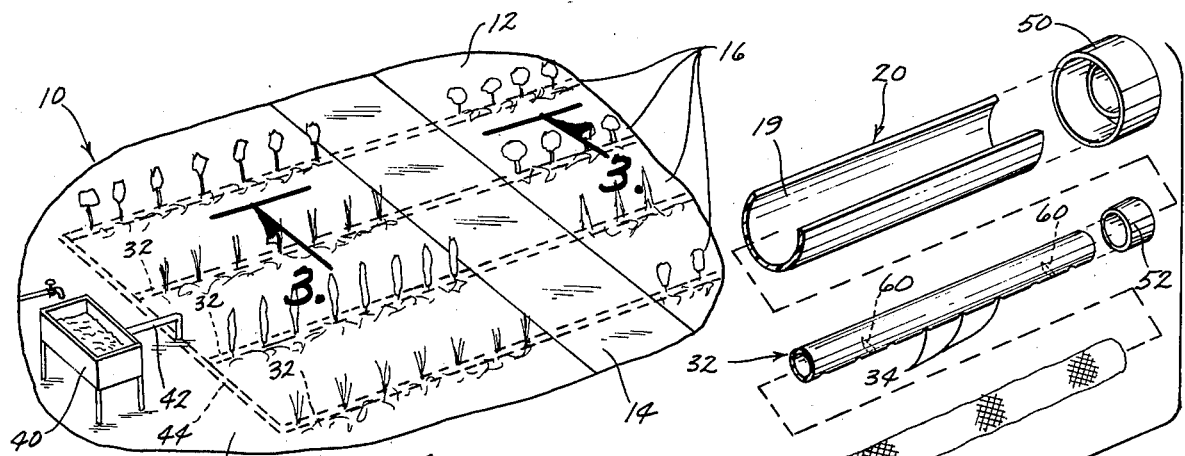
Fig. 1
Fig. 2
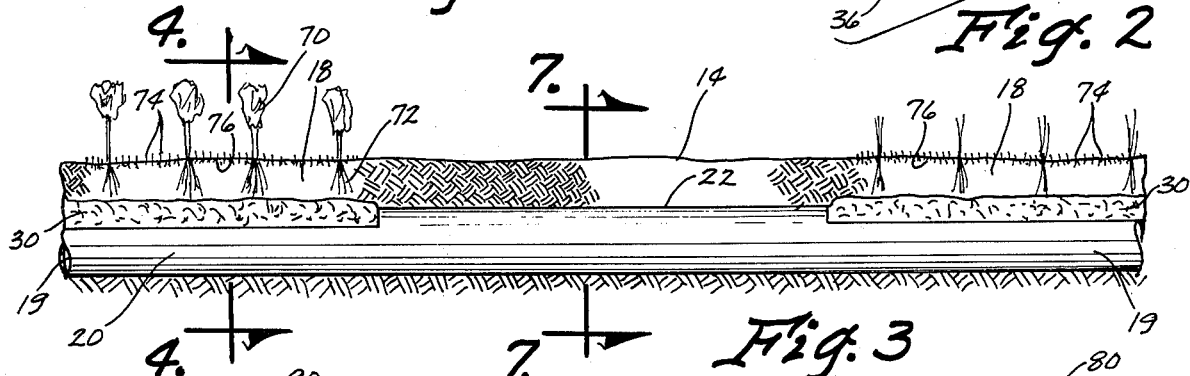
Fig. 3
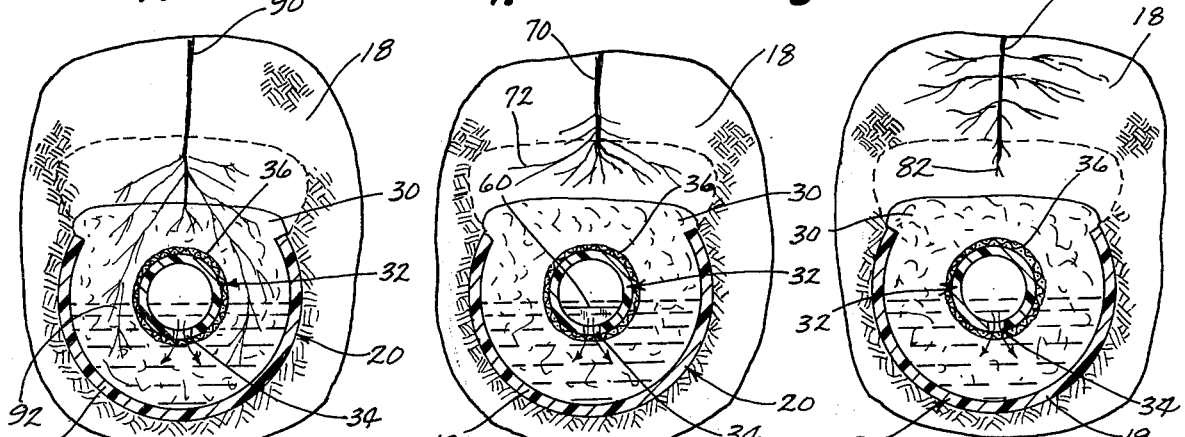
Fig. 4
Fig. 5
Fig. 6
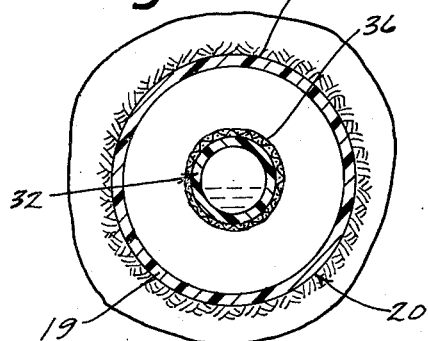
Fig. 7

METHOD AND MEANS FOR IRRIGATING SOIL AND GROWING PLANTS HAVING VARYING WATER REQUIREMENTS

BACKGROUND OF THE INVENTION

This invention relates to plant growing mediums and the method and means for efficiently irrigating only the soil in the plant growing medium being utilized by the plants.

Numerous approaches have been followed in irrigating soil as discussed in U.S. Pat. No. 2,850,843 wherein water from the water table is transmitted to an earth covered trench having a layer of bentonite via a series of bores filled with capillary material. This approach presents a number of problems even if the water table is accessible. The bores are in direct contact with the soil and will yield water to the surrounding soil as it is being transmitted upwardly and thus soil to the side as well as above will be moisturized. This is the problem with all types of irrigation. The soil utilized for growing the plants is not the only soil being irrigated and thus most of the water is not productively utilized. If the water is placed on top of the ground, it is also lost to the atmosphere through evaporation.

Furthermore, ideally the plants need a growing medium that gives them a choice in satisfying their water requirements and thus a growing medium is needed that will sustain plants having varying water requirements. The growing medium should allow for different plants to grow together whether their roots grow deep or shallow.

The present invention provides such a growing medium and soil irrigation system.

SUMMARY OF THE INVENTION

In accordance with the present invention water supplied to the growing medium is substantially completely utilized for the growing of plants and is not lost to ground to the sides or below the growing medium supporting the plant life. Moisture is also not lost through evaporation as the water is supplied under the top soil cover.

A trench is provided under the soil cover and includes a material having high absorption and retention characteristics allowing it to hold and dispense water to the plants in the soil cover thereabove. A preferred material is Vitera manufactured by Union Carbide Corporation. Thus, the water retention and dispensing material holds and dispenses water only to the soil thereabove for direct use by plant roots in that soil. The plant roots may at their option grow as deep as they need to to acquire the water needed for their requirements.

DESCRIPTION OF THE DRAWINGS

FIG. 1 is a fragmentary plan view of a field or garden utilizing the method and means for irrigating soil and growing plants having varying water requirements.

FIG. 2 is an exploded view of the trench including the water pipe.

FIG. 3 is a cross-sectional view taken along line 3—3 in FIG. 1.

FIGS. 4, 5 and 6 are cross-sectional views taken along line 4—4 in FIG. 3 illustrating plants having different water requirements growing in the system.

FIG. 7 is a cross-sectional view taken along line 7—7 in FIG. 3.

DESCRIPTION OF THE PREFERRED EMBODIMENT

The growing system of this invention is referred to generally in FIG. 1, by the reference numeral 10, and includes a field 12 having a walk area 14 extending across rows 16 of different type plants having different water requirements.

Specifically, each row 16 includes a layer of soil cover 18 beneath which a trench 19 is formed by a plastic semi-circular channel shaped pipe 20 being provided with its open side facing upwardly. Beneath the walk 14 is a pipe portion 22 enclosed on top since no plant life is supported thereabove.

The trench 19 is filled with a water retention and dispensing material 30 which is in direct contact with the cover soil 18. The material 30 will absorb and hold water equal to many times its own weight. A preferred material is Vitera available from Union Carbide Corporation.

Water is supplied to the Vitera material 30 by a water conduit 32 having bottom disposed holes 34 along its length for dispensing water into the Vitera 30. The pipe 32 includes a portion under the walk 14 which does not include holes since no water is required in this area.

A screen 36 is provided on the outside of the pipe 32 to keep soil and Vitera out of the holes 34.

Water is supplied to growing system 10 in any desired manner but preferably is gravity fed from a tank 40 through a pipe 42 connected to a header 44 in turn connected to pipes 32 under the rows 16. Water will be trickle fed in sufficient quantity to maintain the Vitera material substantially saturated for feeding the soil cover 18 water through capillary action. Caps 50 and 52 may be provided on the ends of the pipes 20 and 32 but are not required. The volume of water may be metered such that if water begins to run from the end of the uncapped pipes 20 and 32, it is apparent excessive water is being supplied. Since water would have a tendency to run to the lower level if the ground is unlevel, dams 60 are provided in the pipe 32 and thus the dams 60 retain a certain amount of water in each section for maintaining the Vitera material 30 in a moist condition.

It is thus seen that plants having varying water requirements may be grown in the same growing medium wherein the roots are given a choice as to the amount of water they consume by the depth to which they extend in search for water. The deeper they grow the more water they can take on with the greatest amount of water being in the Vitera material itself. It is thus seen that grass cover 74 having shallow roots 76 may grow in side by side relationship to plants having substantially longer roots, such as seen in FIGS. 4, 5, and 6. It is appreciated that soil erosion can be inhibited by the maintenance of a grass cover over the ground and yet not substantially detract from the water supply for the field crop. It is further appreciated that the grass cover will limit evaporation of top soil moisture. Furthermore, weeds will be less of a problem and will not necessitate their removal since sufficient water will be available for the field crop, notwithstanding the presence of the weeds. Additionally, it is believed that crops may be grown closer together due to the fact that an unlimited amount of water is available for supporting a higher concentration of plant life.

The cafeteria type feeding of plants having varying water requirements also provides maximum water efficiency, since irrigation of the soil is limited to that soil directly supporting plant life. Furthermore, water is not lost to the atmosphere through evaporation as it is introduced into the soil below the cover soil.

What is claimed is:

1. A method of irrigating soil and growing plants having varying water requirements including the steps of,
   providing a growing medium having top and bottom layers with the top layer being soil and the bottom layer being a material having substantially greater water holding and retention characteristics than said top layer of soil thereby substantially restricting the transmission of water from said bottom layer to said top layer by capillary action,
   insulating the bottom layer from soil to the sides and therebelow, and
   supplying water to the bottom layer of growing medium to maintain it substantially saturated whereby plant roots may grow downwardly toward and into said lowermost layer to the level suitable for their water requirements.

2. The method of claim 1 wherein said bottom layer of material is Vitera.

3. A method of irrigating soil and growing plants comprising the steps of,
   providing a substantially water impermeable earth covered channel shaped trench including water absorbing material disposed within the trench and in contact with the earth cover,
   situating a plant in the earth cover at a position directly above said water absorbing material for growth of the plant roots towards said material,
   supplying water to the trench to maintain the water absorbing material in a substantially saturated condition, and
   said water absorbing material having substantially greater water holding and retention characteristics than said earth cover thereby substantially restricting the transmission of water from said material to said earth cover by capillary action.

4. The method of claim 3 wherein said water absorbing material is Vitera.

5. An irrigated plant growing medium for plants having varying water requirements insulated from relatively drier soil laterally adjacent and below comprising,
   a trench impermeable to water along its sides and bottom below a top layer of soil,
   water retention material in the trench in direct contact with the top layer of soil, said material having substantially greater water holding and retention characteristics than said top layer of soil thereby substantially restricting the transmission of water from said material to said top layer by capillary action,
   water supply means in communication with the water retention material to maintain the material substantially saturated, and
   said trench situated directly below said plants whereby plant roots may grow downwardly toward and into the water retention material to the level suitable for their water requirements.

6. The irrigated plant growing medium of claim 5 wherein said water retention material is Vitera.

7. The irrigated plant growing medium of claim 5 wherein said water supply means is further defined as a water conduit positioned in said trench in said water retention material, said conduit including outlet openings along its length for dispensing water into said water retention material and dam means within said conduit to assure water being supplied to all outlet openings along the length of said conduit.

8. The irrigated plant growing medium of claim 5 wherein said trench includes upstanding side walls on opposite sides of a bottom wall, said side walls extending upwardly substantially to the top of said water retention material.

* * * * *